US011052898B2

(12) United States Patent
Bolthouse et al.

(10) Patent No.: US 11,052,898 B2
(45) Date of Patent: Jul. 6, 2021

(54) METHODS AND SYSTEM FOR MANAGING TORQUE OF A DRIVELINE

(71) Applicant: Ford Global Technologies, LLC, Dearborn, MI (US)

(72) Inventors: Alec Bolthouse, Dearborn, MI (US); Minku Lee, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 188 days.

(21) Appl. No.: 16/294,250

(22) Filed: Mar. 6, 2019

(65) Prior Publication Data

US 2020/0282971 A1 Sep. 10, 2020

(51) Int. Cl.
*B60W 20/10* (2016.01)
*B60W 10/06* (2006.01)
*B60W 10/08* (2006.01)
*B60W 20/40* (2016.01)

(52) U.S. Cl.
CPC ............ *B60W 20/10* (2013.01); *B60W 10/06* (2013.01); *B60W 10/08* (2013.01); *B60W 20/40* (2013.01); *B60W 2510/0283* (2013.01); *B60W 2510/081* (2013.01); *B60W 2540/10* (2013.01); *B60W 2710/0677* (2013.01); *B60W 2710/086* (2013.01); *B60Y 2200/92* (2013.01)

(58) Field of Classification Search
CPC ..................................................... B60W 20/10
See application file for complete search history.

(56) References Cited

U.S. PATENT DOCUMENTS

| 7,350,602 | B2 * | 4/2008 | Colvin ............... F02N 11/0848 |
| | | | 180/65.28 |
| 8,442,711 | B2 | 5/2013 | Syed et al. |
| 8,831,809 | B2 * | 9/2014 | Wang .................... B60K 6/445 |
| | | | 701/22 |
| 9,168,914 | B2 * | 10/2015 | Martin ..................... B60K 6/48 |
| 9,827,969 | B2 * | 11/2017 | Liang .................... B60W 10/02 |
| 10,106,162 | B2 * | 10/2018 | Thompson ............. B60K 6/387 |
| 10,220,833 | B2 * | 3/2019 | Zhang ..................... B60K 6/48 |
| 2014/0012442 | A1 | 1/2014 | Wang et al. |
| 2015/0197233 | A1 | 7/2015 | Martin et al. |
| 2016/0111990 | A1 * | 4/2016 | Books ................... B60W 20/13 |
| | | | 322/23 |
| 2018/0119808 | A1 * | 5/2018 | Miller ................... B60W 20/00 |

* cited by examiner

*Primary Examiner* — Michael A Berns
(74) *Attorney, Agent, or Firm* — David Kelley; McCoy Russell LLP

(57) ABSTRACT

Systems and methods for operating a vehicle that includes an engine that may be automatically stopped and started are described. In one example, a requested driver demand power may be filtered via a first order low pass filter in response to a powertrain speed. The filtered requested driver demand power may be a basis for automatically stopping and starting an engine.

19 Claims, 4 Drawing Sheets

METHODS AND SYSTEM FOR MANAGING TORQUE OF A DRIVELINE

FIELD

The present description relates to methods and a system for a hybrid vehicle that includes an engine that may be automatically stopped and started.

BACKGROUND AND SUMMARY

A hybrid vehicle may include an engine that may be selectively automatically stopped and started responsive to vehicle operating conditions. The engine may be started when a driver demand power is greater than a first threshold power and the engine may be stopped when the driver demand power is less than a second threshold. An electric machine may provide propulsive effort to the vehicle when the engine is not started and the electric machine may also operate in a regenerative mode during conditions of low driver demand power. If a driver applies an accelerator pedal, the engine may be started so that the engine or the engine and the electric machine may provide a requested amount of power to propel the vehicle. If the driver releases the accelerator pedal shortly after applying the accelerator pedal, a negative driveline power may be requested to decelerate the vehicle. Further, the engine speed and the electric machine speed may be high when the negative driveline power is requested. As a result, the engine may be commanded off during conditions during which it may not be desirable to be commanded off. Consequently, the hide fuel economy may be reduced and vehicle occupants may be disturbed by the engine starting and stopping shortly thereafter.

The inventors herein have recognized the above-mentioned issues and have developed a powertrain operating method, comprising: filtering a driver requested powertrain power as a function of powertrain speed to generate a filtered driver requested powertrain power via a controller; and automatically starting an engine via the controller responsive to the filtered driver requested powertrain power.

By filtering a requested driver demand power as a function of powertrain speed, it may be possible to provide the technical result of reducing the possibility of unintended engine stopping events during aggressive driving. In particular, the driver requested powertrain power may be filtered via a low pass filter with a larger time constant at higher powertrain speeds and a smaller time constant at lower powertrain speeds so that the filtered driver requested powertrain power does not fall below an engine off powertrain power level after a partial or full release of the accelerator pedal. The larger time constant at higher powertrain speeds reduces the rate of decline of the filtered driver requested powertrain power so that the possibility of engine stopping may be reduced. The smaller time constant at lower powertrain speeds allows the powertrain to respond quickly to meet driver demand, thereby satisfying vehicle drivability metrics.

The present description may provide several advantages. In particular, the approach may improve vehicle drivability. Further, the approach may reduce the possibility of unwanted engine stopping events that may increase fuel consumption. In other words, by maintaining the engine on and operating, vehicle emissions and fuel economy may be improved as compared to if the engine is stopped shortly after it is started. In addition, the approach provides for filtering driver requested powertrain power for accelerator pedal application one way and filtering driver requested powertrain power for accelerator pedal release in a different way so that vehicle drivability may be improved.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

The present description is related to operating a hybrid vehicle that includes an engine that may be automatically stopped (e.g., the engine may be stopped in response to vehicle operating conditions via a controller without a human or autonomous driver specifically requesting an engine stop via a dedicated input that has sole function(s) for stopping and starting the engine, such as a pushbutton or key switch) and automatically started (e.g., the engine may be started in response to vehicle operating conditions via a controller without a human or autonomous driver specifically requesting an engine start via a dedicated input that has sole function(s) for stopping and starting the engine, such as a pushbutton or key switch). The approach includes filtering a driver requested powertrain power of a vehicle as a function of powertrain speed so that the possibility of the filtered driver requested powertrain power being less than an engine off power threshold is reduced, thereby preventing unwanted engine stopping when a driver drives aggressively. The vehicle may include an engine of the type shown in FIG. 1. The engine may be included in a driveline as shown in FIG. 2. The vehicle may operate according to the sequences of FIG. 3. The vehicle may be operated according to the method of FIG. 4 to reduce the possibility of unwanted engine stops during aggressive driving.

Figure 1:
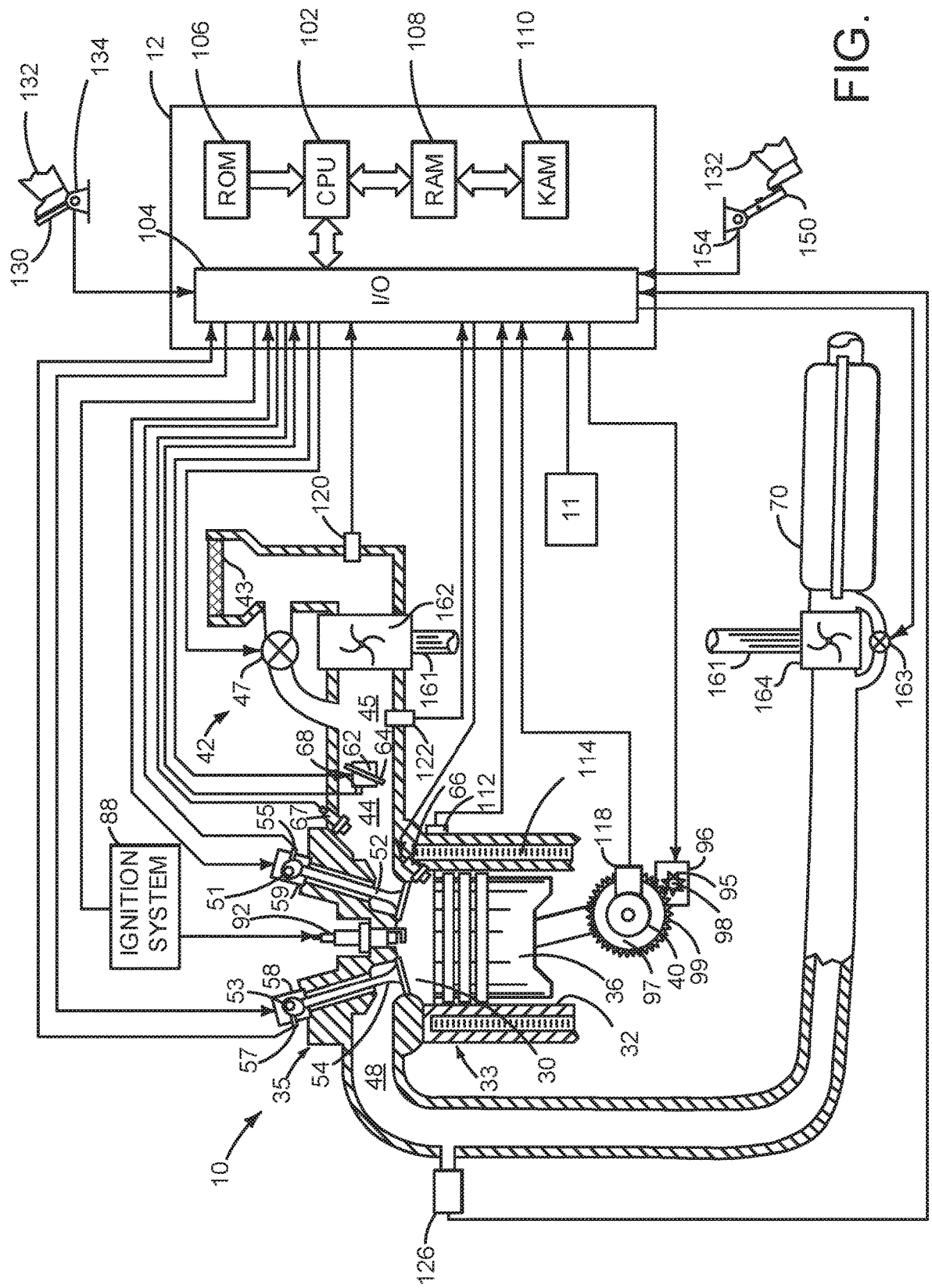
FIG. 1 is a schematic diagram of an engine.
Figure 2:
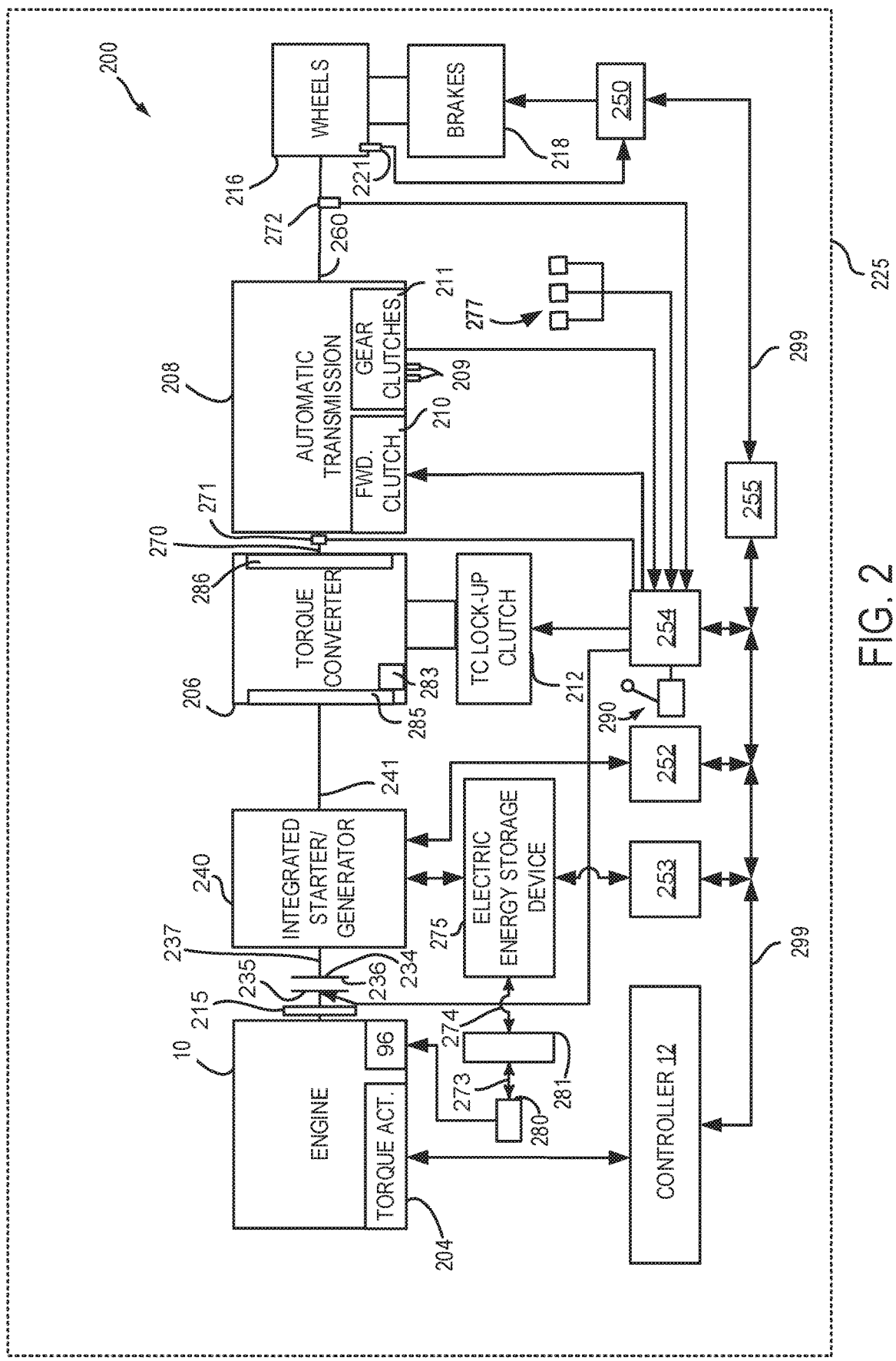
FIG. 2 is a schematic diagram of a first vehicle driveline.

Referring to FIG. 1, internal combustion engine 10, comprising a plurality of cylinders, one cylinder of which is shown in FIG. 1, is controlled by electronic engine controller 12. The controller 12 receives signals from the various sensors shown in FIGS. 1 and 2. The controller employs the actuators shown in FIGS. 1 and 2 to adjust engine and driveline or powertrain operation based on the received signals and instructions stored in memory of controller 12.

Engine 10 is comprised of cylinder head 35 and block 33, which include combustion chamber 30 and cylinder walls 32. Piston 36 is positioned therein and reciprocates via a connection to crankshaft 40. Flywheel 97 and ring gear 99 are coupled to crankshaft 40. Starter 96 (e.g., low voltage (operated with less than 30 volts) electric machine) includes pinion shaft 98 and pinion gear 95. Pinion shaft 98 may selectively advance pinion gear 95 via solenoid 93 to engage ring gear 99. Starter 96 may be directly mounted to the front of the engine or the rear of the engine. In some examples, starter 96 may selectively supply power to crankshaft 40 via a belt or chain. In one example, starter 96 is in a base state when not engaged to the engine crankshaft 40 and flywheel ring gear 99.

Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam ay be determined by exhaust cam sensor 57. intake valve 52 may be selectively activated and deactivated by valve activation device 59. Exhaust valve 54 may be selectively activated and deactivated by valve activation device 58. Valve activation devices 58 and 59 may be electromechanical devices.

Direct fuel injector 66 is shown positioned to inject fuel directly into cylinder 30, which is known to those skilled in the art as direct injection. Port fuel injector 67 is shown positioned to inject fuel into the intake port of cylinder 30, which is known to those skilled in the art as port injection. Fuel injectors 66 and 67 deliver liquid fuel in proportion to pulse widths provided by controller 12. Fuel is delivered to fuel injectors 66 and 67 by a fuel system (not shown) including a fuel tank, fuel pump, and fuel rail (not shown).

In addition, intake manifold 44 is shown communicating with turbocharger compressor 162 and engine air intake 42. In other examples, compressor 162 may be a supercharger compressor. Shaft 161 mechanically couples turbocharger turbine 164 to turbocharger compressor 162. Optional electronic throttle 62 adjusts a position of throttle plate 64 to control air flow from compressor 162 to intake manifold 44. Pressure in boost chamber 45 may be referred to a throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Compressor recirculation valve 47 may be selectively adjusted to a plurality of positions between fully open and fully closed. Waste gate 163 may be adjusted via controller 12 to allow exhaust gases to selectively bypass turbine 164 to control the speed of compressor 162. Air filter 43 cleans air entering engine air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of three-way catalyst 70. Alternatively, a two-state exhaust gas oxygen sensor may be substituted for UEGO sensor 126.

Catalyst 70 may include multiple bricks and a three-way catalyst coating, in one example. In another example, multiple emission control devices, each with multiple bricks, can be used.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 (e.g., a human/machine interface) for sensing force applied by human driver 132; a position sensor 154 coupled to brake pedal 150 (e.g., a human/machine interface) for sensing force applied by human driver 132, a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 68. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

Controller 12 may also receive input from human/machine interface 11. A request to start or stop the engine or vehicle may be generated via a human and input to the human/machine interface 11. The human/machine interface 11 may he a touch screen display, pushbutton, key switch or other known device.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition s such as spark plug 92, resulting in combustion.

During the expansion stroke, the expanding gases push piston 36 back to BDC. Crankshaft 40 converts piston movement into a rotational power of the rotary shaft, Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle 225 including a powertrain or driveline 200. The powertrain of FIG. 2 includes engine 10 shown in FIG. 1. Powertrain 200 is shown including vehicle system controller 255, engine controller 12, electric machine controller 252, transmission controller 254, energy storage device controller 253, and brake controller 250. The controllers may communicate over controller area network (CAN) 299. Each of the controllers may provide information to other controllers such as power output limits (e.g., power output of the device or component being controlled not to be exceeded), power input limits (e.g., power input of the device or component being controlled not to be exceeded), power output of the device being controlled, sensor and actuator data, diagnostic information (e.g., information regarding a degraded transmission, information regarding a degraded engine, information regarding a degraded electric machine, information regarding degraded brakes). Further, the vehicle system controller 255 may provide commands to engine controller 12, electric machine controller 252, transmission controller 254, and brake controller 250 to achieve driver input requests and other requests that are based on vehicle operating conditions.

For example, in response to a driver releasing an accelerator pedal and vehicle speed, vehicle system controller 255 may request a desired wheel power or a wheel power level to provide a desired rate of vehicle deceleration. The requested desired wheel power may be provided by vehicle system controller 255 requesting a first braking power from electric machine controller 252 and a second braking power from engine controller 12, the first and second powers providing a desired driveline braking power at vehicle wheels 216. Vehicle system controller 255 may also request a friction braking power via brake controller 250. The braking powers may be referred to as negative powers since they slow driveline and wheel rotation. Positive power may maintain or accelerate driveline and wheel rotation.

In other examples, the partitioning of controlling powertrain devices may be partitioned differently than is shown in FIG. 2. For example, a single controller may take the place of vehicle system controller 255, engine controller 12, electric machine controller 252, transmission controller 254, and brake controller 250. Alternatively, the vehicle system controller 255 and the engine controller 12 may be a single unit while the electric machine controller 252, the transmission controller 254, and the brake controller 250 are stand-alone controller In this example, powertrain 200 may be powered by engine 10 and electric machine 240. In other examples, engine 10 may be omitted. Engine 10 may be started with an engine starting system shown in FIG. 1 or via driveline integrated starter/generator (ISG) 240 also known as an integrated starter/generator. Driveline ISG 240 (e.g., high voltage (operated with greater than 30 volts) electrical machine) may also be referred to as an electric machine, motor, and/or generator. Further, power of engine 10 may be adjusted via power actuator 204, such as a fuel injector, throttle, etc.

Bi-directional DC/DC converter 281 may transfer electrical energy from a high voltage buss 274 to a low voltage buss 273 or vice-versa. Low voltage battery 280 is electrically coupled to low voltage buss 273. Electric energy storage device 275 is electrically coupled to high voltage buss 274. Low voltage battery 280 selectively supplies electrical energy to starter motor 96.

An engine output power may be transmitted to an input or first side of powertrain disconnect clutch 235 through dual mass flywheel 215. Disconnect clutch 236 may be electrically or hydraulically actuated. The downstream or second side 234 of disconnect clutch 236 is shown mechanically coupled to ISG input shaft 237.

Disconnect clutch 236 may be fully closed when engine 10 is supplying power to vehicle wheels 216. Disconnect clutch 236 may be fully open when engine 10 is stopped (e.g., not combusting fuel) or when engine 10 is supplying power to BISG 219 and BISG 219 is generating electrical charge to charge electric energy storage device 275 or supplying electrical charge to ISG 240.

ISG 240 may be operated to provide power to powertrain 200 or to convert powertrain power into electrical energy to be stored in electric energy storage device 275 in a regeneration mode. ISG 240 is in electrical communication with energy storage device 275. ISG 240 has a higher output power capacity than starter 96 shown in FIG. 1. Further, ISG 240 directly drives powertrain 200 or is directly driven by powertrain 200. There are no belts, gears, or chains to couple ISG 240 to powertrain 200. Rather, ISG 240 rotates at the same rate as powertrain 200. Electrical energy storage device 275 (e.g., high voltage battery or power source) may be a battery, capacitor, or inductor. The downstream side of ISG 240 is mechanically coupled to the impeller 285 of torque converter 206 via shaft 241. The upstream side of the ISG 240 is mechanically coupled to the disconnect clutch 236. ISG 240 may provide a positive power or a negative power to powertrain 200 via operating as a motor or generator as instructed by electric machine controller 252.

Torque converter 206 includes a turbine 286 to output power to input shaft 270. Input shaft 270 mechanically couples torque converter 206 to automatic transmission 208. Torque converter 206 also includes a torque converter bypass lock-up clutch 212 (TCC). Power is directly transferred from impeller 285 to turbine 286 when TCC is locked. TCC is electrically operated by controller 12. Alternatively, TCC may be hydraulically locked. In one example, the torque converter may be referred to as a component of the transmission.

When torque converter lock-up clutch 212 is fully disengaged, torque converter 206 transmits engine power to automatic transmission 208 via fluid transfer between the torque converter turbine 286 and torque converter impeller 285, thereby enabling power multiplication. In contrast, when torque converter lock-up clutch 212 is fully engaged, the engine output power is directly transferred via the torque converter clutch to an input shaft 270 of transmission 208. Alternatively, the torque converter lock-up clutch 212 may be partially engaged, thereby enabling the amount of power directly relayed to the transmission to be adjusted. The transmission controller 254 may be configured to adjust the amount of power transmitted by torque converter 212 by adjusting the torque converter lock-up clutch in response to various engine operating conditions, or based on a driver-based engine operation request.

Torque converter 206 also includes pump 283 that pressurizes fluid to operate disconnect clutch 236, forward clutch 210, and gear clutches 211. Pump 283 is driven via impeller 285, which rotates at a same speed as ISG 240.

Automatic transmission 208 includes gear clutches (e.g., gears 1-10) 211 and forward clutch 210. Automatic transmission 208 is a fixed ratio transmission. Alternatively, transmission 208 may be a continuously variable transmission that has a capability of simulating a fixed gear ratio transmission and fixed gear ratios. The gear clutches 211 and the forward clutch 210 may be selectively engaged to change a ratio of an actual total number of turns of input shaft 270 to an actual total number of turns of wheels 216. Gear clutches 211 may be engaged or disengaged via adjusting fluid supplied to the clutches via shift control solenoid valves 209. Power output from the automatic transmission 208 may also be relayed to wheels 216 to propel the vehicle via output shaft 260. Specifically, automatic transmission 208 may transfer an input driving power at the input shaft 270 responsive to a vehicle traveling condition before transmitting an output driving power to the wheels 216. Transmission controller 254 selectively activates or engages TCC 212, gear clutches 211, and forward clutch 210. Transmission controller also selectively deactivates or disengages TCC 212, gear clutches 211, and forward clutch 210.

Further, a frictional force may be applied to wheels 216 by engaging friction wheel brakes 218. In one example, friction wheel brakes 218 may be engaged in response to a human driver pressing their foot on a brake pedal (not shown) and/or in response to instructions within brake controller 250. Further, brake controller 250 may apply brakes 218 in response to information and/or requests made by vehicle system controller 255. In the same way, a frictional force may be reduced to wheels 216 by disengaging wheel brakes 218 in response to the human driver releasing their foot from a brake pedal, brake controller instructions, and/or vehicle system controller instructions and/or information. For example, vehicle brakes may apply a frictional force to wheels 216 via controller 250 as part of an automated engine stopping procedure.

In response to a request to accelerate vehicle 225, vehicle system controller may obtain a driver demand power or power request from an accelerator pedal or other device. Vehicle system controller 255 then allocates a fraction of the requested driver demand power to the engine and the remaining fraction to the ISG. Vehicle system controller 255 requests the engine power from engine controller 12 and the ISG power from electric machine controller 252. If the ISG power plus the engine power is less than a transmission input power limit (e.g., a threshold value not to be exceeded), the power is delivered to torque converter 206 which then relays at least a fraction of the requested power to transmission input shaft 270. Transmission controller 254 selectively locks torque converter clutch 212 and engages gears via gear clutches 211 in response to shift schedules and TCC lockup schedules that may be based on input shaft power and vehicle speed. In some conditions when it may be desired to charge electric energy storage device 275, a charging power a negative ISG power) may be requested while a non-zero driver demand power is present. Vehicle system controller 255 may request increased engine power to overcome the charging power to meet the driver demand power.

In response to a request to decelerate vehicle 225 and provide regenerative braking, vehicle system controller may provide a negative desired wheel power (e.g., desired or requested powertrain wheel power) based on vehicle speed and brake pedal position. Vehicle system controller 255 then allocates a fraction of the negative desired wheel power to the ISG 240 and the engine 10. Vehicle system controller may also allocate a portion of the requested braking power to friction brakes 218 (e.g., desired friction brake wheel power). Further, vehicle system controller may notify transmission controller 254 that the vehicle is in regenerative braking mode so that transmission controller 254 shifts gears 211 based on a unique shifting schedule to increase regeneration efficiency. Engine 10 and ISG 240 may supply a negative power to transmission input shaft 270, but negative power provided by ISG 240 and engine 10 may be limited by transmission controller 254 which outputs a transmission input shaft negative power limit (e.g., not to be exceeded threshold value). Further, negative power of ISG 240 may be limited (e.g., constrained to less than a threshold negative threshold power) based on operating conditions of electric energy storage device 275, by vehicle system controller 255, or electric machine controller 252. Any portion of desired negative wheel power that may not be provided by ISG 240 because of transmission or ISG limits may be allocated to engine 10 and/or friction brakes 218 so that the desired wheel power is provided by a combination of negative power power absorbed) via friction brakes 218, engine 10, and ISG 240.

Accordingly, power control of the various powertrain components may be supervised by vehicle system controller 255 with local power control for the engine 10, transmission 208, electric machine 240, and brakes 218 provided via engine controller 12, electric machine controller 252, transmission controller 254, and brake controller 250.

As one example, an engine power output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine power output by controlling a combination of fuel pulse width, fuel pulse timing, and air charge. Engine braking power or negative engine power may be provided by rotating the engine with the engine generating power that is insufficient to rotate the engine. Thus, the engine may generate a braking power via operating at a low power while combusting fuel, with one or more cylinders deactivated (e.g., not combusting fuel), or with all cylinders deactivated and while rotating the engine. The amount of engine braking power may be adjusted via adjusting engine valve timing. Engine valve timing may be adjusted to increase or decrease engine compression work. Further, engine valve timing may be adjusted to increase or decrease engine expansion work. In all cases, engine control may be performed on a cylinder-by-cylinder basis to control the engine power output.

Electric machine controller 252 may control power output and electrical energy production from ISG 240 by adjusting current flowing to and from field and/or armature windings of ISG as is known in the art Transmission controller 254 receives transmission input shaft position via position sensor 271. Transmission controller 254 may convert transmission input shaft position into input shaft speed via differentiating a signal from position sensor 271 or counting a number of known angular distance pulses over a predetermined time interval. Transmission controller 254 may receive transmission output shaft torque from torque sensor 272. Alternatively, sensor 272 may be a position sensor or torque and position sensors. If sensor 272 is a position sensor, controller 254 may count shaft position pulses over a predetermined time interval to determine transmission output shaft velocity. Transmission controller 254 may also differentiate transmission output shaft velocity to determine transmission output shaft acceleration. Transmission controller 254, engine controller 12, and vehicle system controller 255, may also receive addition transmission information from sensors 277, which may include but are not limited to pump output line pressure sensors, transmission hydraulic pressure sensors (e.g., gear clutch fluid pressure sensors), ISG temperature sensors, and BISG temperatures, gear shift lever sensors, and ambient temperature sensors. Transmission controller 254 may also receive requested gear input from gear shift selector 290 (e.g., a human/machine interface device). Gear shift lever may include positions for gears 1-N (where N is an upper gear number), D (drive), and P (park).

Brake controller 250 receives wheel speed information via wheel speed sensor 221 and braking requests from vehicle system controller 255. Brake controller 250 may also receive brake pedal position information from brake pedal sensor 154 shown in FIG. 1 directly or over CAN 299.

Brake controller 250 may provide braking responsive to a wheel power command from vehicle system controller 255. Brake controller 250 may also provide anti-lock and vehicle stability braking to improve vehicle braking and stability. As such, brake controller 250 may provide a wheel power limit (e.g., a threshold negative wheel power not to be exceeded) to the vehicle system controller 255 so that negative ISG power does not cause the wheel power limit to be exceeded. For example, if controller 250 issues a negative wheel power limit of 50 Newton-meters, ISG power is adjusted to provide less than 50 Newton-meters (e.g., 49 Newton-meters) of negative power at the wheels, including accounting for transmission gearing.

Thus, the system of FIGS. 1 and 2 provides for a system, comprising: an engine; an accelerator pedal; and a controller including executable instructions stored in non-transitory memory to generate a driver requested powertrain power via the accelerator pedal, instructions to filter the driver requested powertrain power as a function of a powertrain speed to generate a filtered driver requested powertrain power, and instructions to start and stop the engine responsive to the filtered driver requested powertrain power. The system further comprises additional instructions to adjust output of the engine responsive to the filtered driver requested powertrain power. The system includes where filtering the driver requested powertrain power includes filtering the driver requested powertrain power via a first order low pass filter. The system includes where the first order low pass filter includes a time constant. The system further comprises additional instructions to adjust the time constant as a function of the powertrain speed. The system includes where the powertrain speed is a speed of a torque converter impeller.

Figure 3:
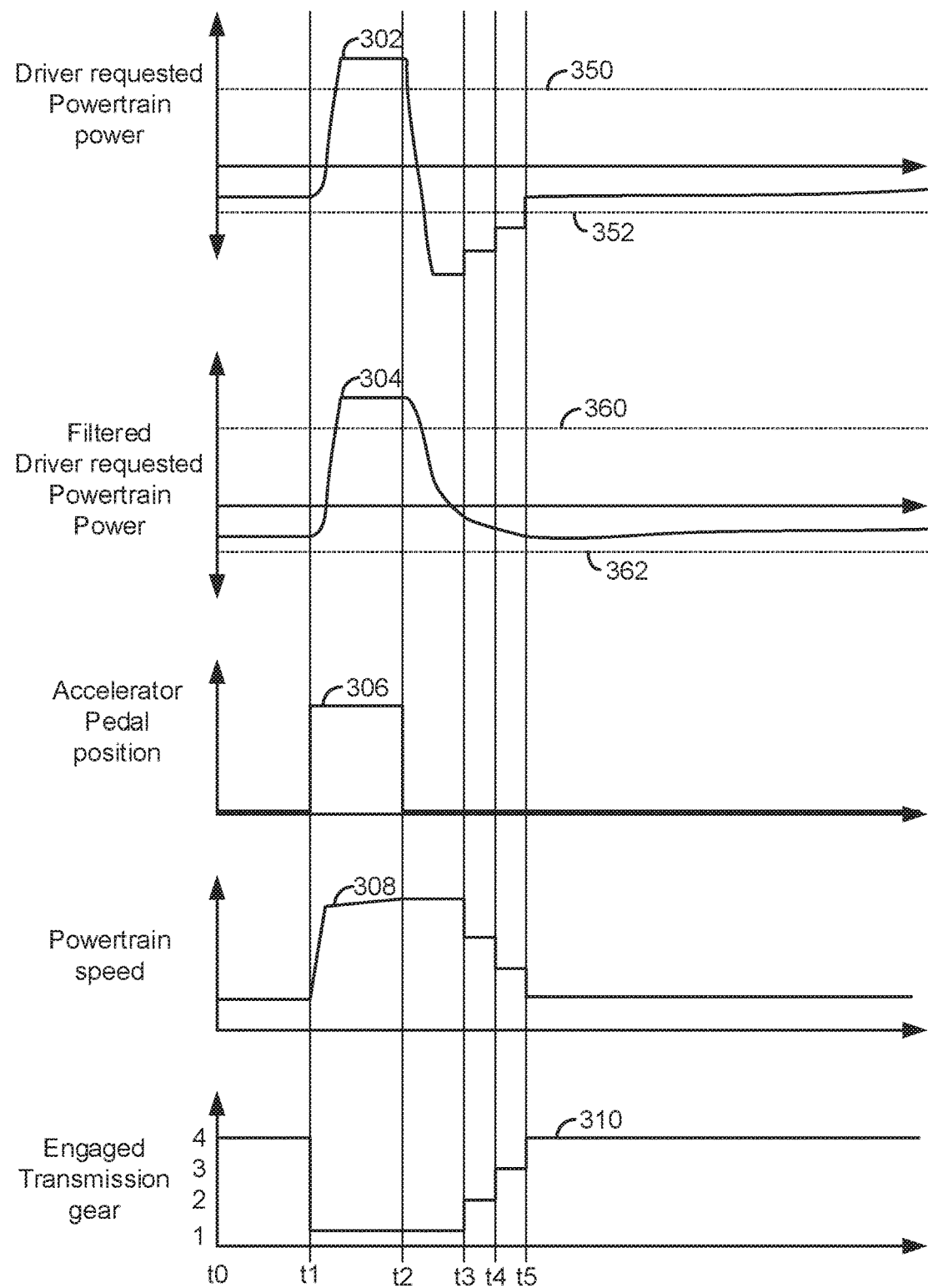
FIG. 3 shows plots of an example driveline operating sequence according to the method of FIG. 4.
Figure 4:
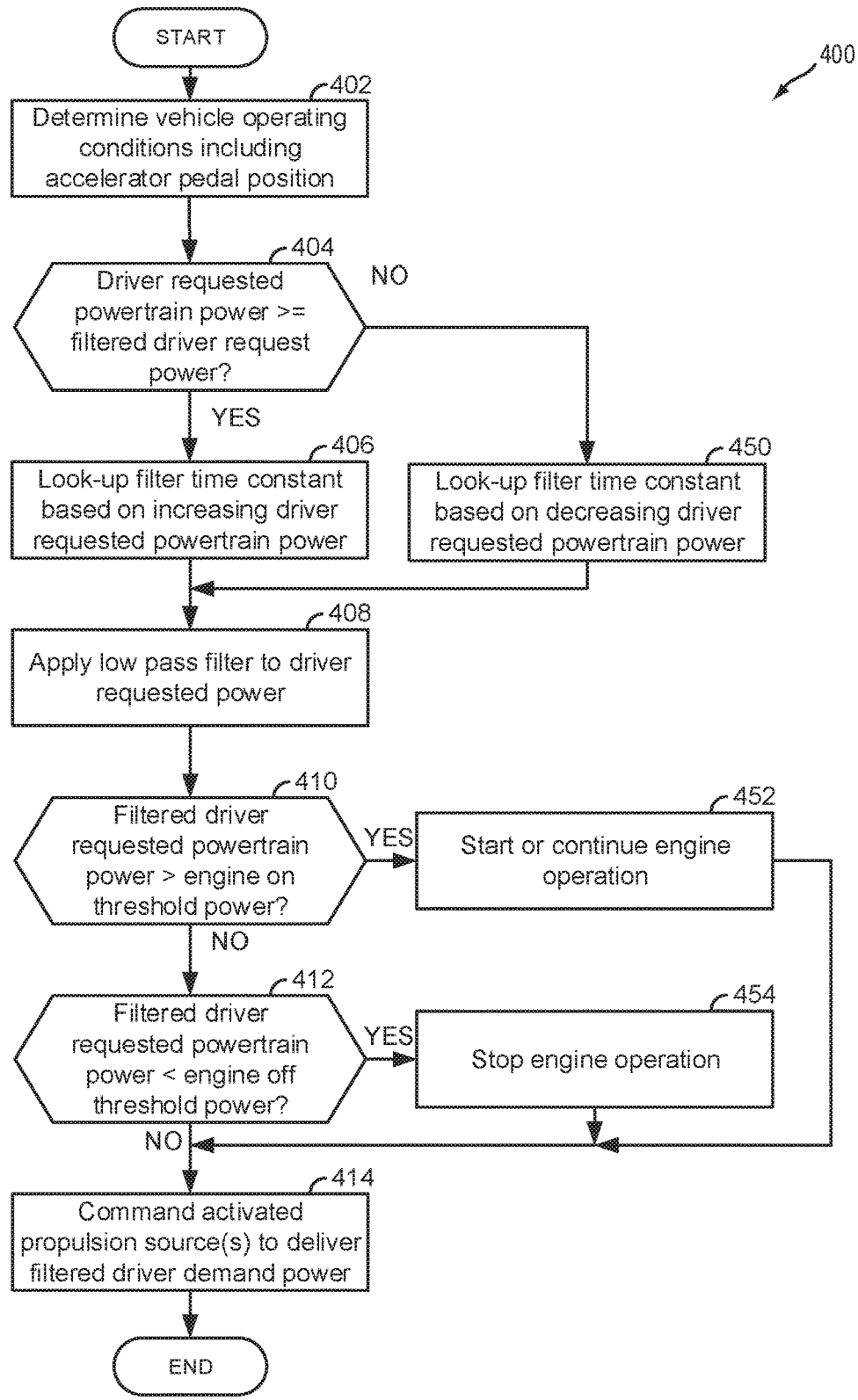
FIG. 4 shows a method for operating a driveline.

Referring now to FIG. 3, plots of a prophetic vehicle operating sequence according to the method of FIG. 4 and the system of FIGS. 1 and 2 are shown. The plots are aligned in time and occur at a same time. The vertical lines at t0-t5 show particular times of interest.

The first plot from the top of FIG. 3 is a plot of an unfiltered driver requested powertrain or driveline power versus time. The vertical axis represents the driver requested powertrain power and the driver requested powertrain power is positive when trace 302 is above the horizontal axis. The driver requested powertrain power is negative (e.g., regenerative braking) when trace 302 is below the horizontal axis. The driver requested powertrain power increases positively in the direction of the vertical axis arrow pointing to the top of the figure. The driver requested powertrain power magnitude increases in the negative direction of the vertical axis arrow pointing to the bottom of the figure. The horizontal axis represents time and the time increases from the left side of the figure to the right side of the figure. Horizontal line 350 represents an engine on threshold powertrain power request that the filtered driver requested powertrain power may be compared to. Horizontal line 352 represents an engine off threshold powertrain power request that the filtered driver requested powertrain power may be compared to. Trace 302 represents the unfiltered driver requested powertrain power.

The second plot from the top of FIG. 3 is a plot of filtered driver requested powertrain or driveline power request versus time. The vertical axis represents the filtered driver requested powertrain power level or value and the filtered driver requested powertrain power is positive when trace 304 is above the horizontal axis. The filtered driver requested powertrain power is negative (e.g., regenerative braking) when trace 304 is below the horizontal axis. The filtered driver requested powertrain power increases positively in the direction of the vertical axis arrow pointing to the top of the figure. The filtered driver requested powertrain power magnitude increases in the negative direction of the vertical axis arrow pointing to the bottom of the figure. The horizontal axis represents time and the time increases from the left side of the figure to the right side of the figure. Horizontal line 360 represents an engine on threshold powertrain power request. The engine is requested started and running (e.g., rotating the crankshaft and combusting fuel) when the filtered driver requested powertrain power trace 304 is above horizontal line 360. Horizontal line 362 represents an engine off threshold powertrain power request. The engine is requested stopped (e.g., not rotating the crankshaft and not combusting fuel) when the filtered driver requested powertrain power trace 304 is below horizontal line 362. Trace 304 represents the filtered driver requested powertrain power.

The third plot from the top of FIG. 3 is a plot of accelerator pedal position versus time. The vertical axis represents accelerator pedal position and the accelerator pedal is applied to a greater extent in the direction of the vertical axis arrow. The horizontal axis represents time and the time increases from the left side of the figure to the right side of the figure. Trace 306 represents the accelerator pedal position.

The fourth plot from the top of FIG. 3 is a plot of powertrain speed (e.g., speed of ISG 240 and speed of engine 10 when the driveline disconnect clutch is fully closed) versus time. The vertical axis represents powertrains speed and powertrain speed increases in the direction of the vertical axis arrow. The horizontal axis represents time and the time increases from the left side of the figure to the right side of the figure. Trace 308 represents the powertrain speed.

The fifth plot from the top of FIG. 3 is a plot of engaged transmission gear (e.g., transmission gear that is transferring powertrain torque) versus time. The vertical axis represents engaged transmission gear and gear numbers are listed along the vertical axis. The horizontal axis represents time and the time increases from the left side of the figure to the right side of the figure. Trace 310 represents the engaged transmission gear.

At time t0, the engine is stopped (e.g., not combusting fuel and not rotating) and the driver requested powertrain power is negative. Such conditions may be present when the accelerator pedal is released as shown. The filtered driver requested powertrain power and the unfiltered driver requested powertrain power are equal. The powertrain speed is low and the transmission is engaged in fourth gear.

At time t1, the driver (not shown) applies the accelerator pedal, thereby increasing the driver requested powertrain power. The accelerator pedal position is converted into a driver requested powertrain power via referencing a table or function of empirically determined driver requested powertrain power values according to the accelerator pedal position and vehicle speed. The table or function outputs the driver requested powertrain power. The driver requested powertrain power is processed via a low pass filter with a small time constant (e.g., zero) to generate the filtered driver requested powertrain power. The powertrain speed increases as the accelerator pedal position increases since powertrain torque increases with increasing accelerator pedal position. The transmission is downshifted to first gear increase the powertrain torque.

Between time t1 and time t2, the unfiltered driver requested powertrain power increases to a level that is above threshold 350. If the engine were started based on the unfiltered driver requested powertrain power, it would be started at the time trace 302 exceeds threshold 350. The filtered driver requested powertrain power increases with the unfiltered driver requested powertrain power since the low pass powertrain power request filter is being applied with a small time constant. The engine is started when trace 304 exceeds the level of threshold 360. The powertrain speed levels increases and the transmission remains in first gear.

At time t2, the driver (not shown) fully releases the accelerator pedal and causes the unfiltered driver requested powertrain power to decrease. The filtered driver requested powertrain power begins to decrease at a slower rate than the unfiltered driver requested powertrain power because of the time constant of the powertrain power request low pass filter. The driveline speed levels off to a nearly constant level and the transmission remains in first gear.

Between time t2 and time t3, the unfiltered driver requested powertrain power decreases to a level that is less than threshold 352. If the engine were stopped based on the unfiltered driver requested powertrain power, it would be stopped at the time trace 302 fell below threshold 352. The filtered driver requested powertrain power 304 decreases at a slower rate than the unfiltered driver requested powertrain power since the low pass powertrain power request filter is being applied with a larger time constant. The engine is not stopped since trace 304 remains above threshold 362. This may allow the engine to run longer so that the amount of fuel used to start the engine may be a smaller fraction of fuel consumed during engine operation, thereby increasing engine efficiency. The powertrain speed remains at a higher level and the transmission remains in first gear.

At time t3, the transmission upshifts to second gear, thereby causing a decrease in powertrain speed. The accelerator is not applied and the filtered driver requested powertrain power remains above threshold 362 so that the engine continues to run (e.g., rotate and combust fuel). The unfiltered driver requested powertrain power remains below threshold 352, but it is not the basis for engine stopping so the engine continues to run. The filtered driver requested powertrain power magnitude is reduced when the transmission is upshifted.

At time t4, the transmission upshifts to third gear causing a second decrease in powertrain speed. The accelerator is not applied and the filtered driver requested powertrain power remains above threshold 362 so that the engine continues to run. The unfiltered driver requested powertrain power remains below threshold 352. The filtered driver requested powertrain power magnitude is reduced when the transmission is upshifted a second time.

At time t5, the transmission upshifts to fourth gear causing a third decrease in powertrain speed. The accelerator is not applied and the filtered driver requested powertrain power remains above threshold 362 so that the engine continues to run. The unfiltered driver requested powertrain power is now above threshold 352. The filtered driver requested powertrain power magnitude is reduced when the transmission is upshifted a third time.

In this way, a driver requested powertrain power may be filtered as a function of powertrain speed so that the possibility of an unwanted engine stop may be prevented during aggressive driving conditions (e.g., higher rates of change in accelerator pedal position). Consequently, if the driver applies the accelerator pedal after releasing the accelerator pedal, then engine power may be available immediately instead of having to restart the engine.

Referring now to FIG. 4, a flow chart of a method for operating a vehicle in a way that reduces a possibility of undesirable engine stops during aggressive driving is shown. The method of FIG. 4 may be incorporated into and may cooperate with the system of FIGS. 1 and 2. Further, at least portions of the method of FIG. 4 may be incorporated as executable instructions stored in non-transitory memory while other portions of the method may be performed via a controller transforming operating states of devices and actuators in the physical world.

At 402, method 400 determines vehicle operating conditions. Vehicle operating conditions may include but are not limited to powertrain speed (e.g., speed of ISG 240 or input speed to a torque converter, or alternatively, speed of a transmission input shaft), engine speed, engine temperature, electric energy storage device state of charge (SOC), accelerator pedal position, and engine operating state. Method 400 proceeds to 404.

At 404, method 500 judges if a human driver requested powertrain power (e.g., an unfiltered requested powertrain power) is greater than a filtered driver requested powertrain power. The requested powertrain power may be determined via accelerator pedal position and vehicle speed as previously described. If method 400 judges that driver requested powertrain power is greater than the filtered driver requested powertrain power, then the answer is yes and method 400 proceeds to 406. Otherwise, the answer is no and method 400 proceeds to 450.

At 450, method 400 references a first table or first function that holds one or more empirically determined time constants for a low pass filter. The first table or first function holds low pass filter time constants for a decreasing driver requested powertrain power. The first table or first function is referenced or indexed based on powertrain speed. For example, a cell or location housing a time constant value in the first table or function powertrain speed is referenced according to powertrain speed. The first table or first function outputs a time constant for a low pass filter. In one example, the time constants are larger 1.5 seconds) at higher powertrains speeds and smaller (e.g., 0.3 seconds) at lower powertrain speeds. In addition, time constant values in the first table or function are larger than time constant values in the second table or second function that is referenced at 406. Method 400 proceeds to 408 after the time constant τ is output from the first table or first function.

At 406, method 400 references a second table or second function that holds one or more empirically determined time constants for a low pass filter. The second table or second function holds low pass filter time constants for an increasing driver requested powertrain power. The second table or second function is referenced or indexed based on powertrain speed. For example, a cell or location housing a time constant value in the second table or second function powertrain speed is referenced according to powertrain speed. The second table or second function outputs a time constant for a low pass filter. In one example, the time constants re larger (e.g., 0.25 seconds) at higher powertrains speeds and smaller (e.g., 0.0 seconds) at lower powertrain speeds. In addition, time constant values in the second table or second function are smaller than time constant values in the first table or first function that is referenced at 450. Method 400 proceeds to 408 after the time constant τ is output from the first table or first function.

At 408, method 400 applies a low pass filter to the unfiltered driver requested powertrain power. In one example, the low pass filter is of the form:

$$epud\_pdrv(i) = \alpha \cdot (epud\_pdrv\_unfilt(i)) + (1 - \alpha) \cdot (epud\_pdrv(i-1))$$

$$\alpha = \frac{dt}{\tau + dt}$$

where epud_pdry is the filtered driver requested powertrain power, i is the sample number, epud_pdrv_unfilt is the unfiltered driver requested powertrains power, dt is the time between samples, and τ is the time constant. Method 400 proceeds to 410.

At 410, method 400 judges whether or not the filtered driver requested powertrain power is greater than an engine on threshold power (e.g., line 360 in FIG. 3). If so, the answer is yes and method 400 proceeds to 452. Otherwise, the answer is no and method 400 proceeds to 412.

At 452, method 400 automatically starts the engine via rotating the engine via the ISG 240 or starter 96. Further, fuel and spark are delivered to the engine. Method 400 proceeds to 414.

At 412, method 400 judges whether or not the filtered driver requested powertrain power is less than an engine off threshold power (e.g., line 362 in FIG. 3). If so, the answer is yes and method 400 proceeds to 454. Otherwise, the answer is no and method 400 proceeds to 414.

At 454, method 400 automatically stops the engine (e.g., the engine ceases rotating) via ceasing to supply spark and fuel to the engine. Method 400 proceeds to 414.

At 414, method 400 commands the powertrain power sources (e.g., engine 10 and ISG 240) to deliver an amount of power that is equal to the filtered driver requested powertrain power. In one example, the engine may provide a first fraction of the filtered driver requested powertrain power and the ISG may provide a second fraction of the filtered driver requested powertrain power. The first fraction plus the second fraction is equal to the filtered driver requested powertrain power. Method 400 proceeds to exit.

In this way, the driver requested powertrain power may be filtered as a function of powertrain speed. By filtering the requested powertrain power as a function of powertrain speed, it may be possible to reduce the possibility of undesired engine stopping during aggressive driving conditions. Further, powertrain operation during less aggressive conditions may not be altered so as to provide a desired level of vehicle drivability. Further, although the method describes filtering driver requested powertrain power, the method may also filter driver requested powertrain torque in a similar way to provide similar benefits and results.

Thus, the method of FIG. 4 provides for a powertrain operating method, comprising: filtering a driver requested powertrain power as a function of powertrain speed to generate a filtered driver requested powertrain power via a controller; and automatically starting an engine via the controller responsive to the filtered driver requested powertrain power. The method includes where filtering the driver requested powertrain power includes filtering the driver requested powertrain power via a low pass filter. The method includes where the low pass filter includes a time constant. The method further comprises adjusting the time constant based on the powertrain speed. The method includes where adjusting the time constant includes accessing a first look-up table to determine the time constant in response to the filtered requested powertrain power being greater than a filtered driver requested powertrain power. The method includes where adjusting the time constant includes accessing a second look-up table to determine the time constant in response to the driver requested powertrain power being less than a filtered driver requested powertrain power. The method includes where values in the second look-up table are greater than value in the first look-up table. The method includes where powertrain speed is a rotational speed of an electric machine.

The method of FIG. 4 also provides for a powertrain operating method, comprising: filtering a driver requested powertrain power as a function of powertrain speed to generate a filtered driver requested powertrain power via a first order low pass filter within a controller; and adjusting output of a powertrain propulsion source via the controller in response to the filtered driver requested powertrain power. The method include where adjusting output of the powertrain propulsion source includes adjusting output power of an engine, The method includes where adjusting output of the powertrain propulsion source includes adjusting output power of an electric machine. The method includes where the driver requested powertrain power is input via an accelerator pedal. The method further comprises adjusting a time constant of the first order low pass filter as a function of powertrain speed. The method includes where adjusting the time constant of the first order low pass filter includes increasing the time constant in response to the driver requested powertrain power being less than the filtered driver requested powertrain power.

In another representation, the method of FIG. 4 provides for a powertrain operating method, comprising: filtering a driver requested powertrain power as a function of powertrain speed to generate a filtered driver requested powertrain power via a controller; and automatically stopping an engine via the controller responsive to the filtered driver requested powertrain power. The method includes stopping the engine via ceasing to supply fuel to the engine.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, at least a portion of the described actions, operations and/or functions may graphically represent code to be programmed into non-transitory memory of the computer readable storage medium in the control system. The control actions may also transform the operating state of one or more sensors or actuators in the physical world when the described actions are carried out by executing the instructions in a system including the various engine hardware components in combination with one or more controllers.

This concludes the description. The reading of it by those skilled in the art would bring to mind many alterations and modifications without departing from the spirit and the scope of the description. For example, single cylinder, I3, I4, I5, V6, V8, V10, and V12 engines operating in natural gas, gasoline, diesel, or alternative fuel configurations could use the present description to advantage.

The invention claimed is:

1. A powertrain operating method, comprising:
filtering a driver requested powertrain power via a low pass filter, by adjusting a time constant of the low pass filter based on a powertrain speed, to generate a filtered driver requested powertrain power via a controller; and
automatically starting an engine via the controller responsive to the filtered driver requested powertrain power.

2. The method of claim 1, where adjusting the time constant includes accessing a first look-up table to determine the time constant in response to the driver requested powertrain power being greater than the filtered driver requested powertrain power.

3. The method of claim 2, where adjusting the time constant includes accessing a second look-up table to determine the time constant in response to the driver requested powertrain power being less than the filtered driver requested powertrain power.

4. The method of claim 3, where values in the second look-up table are greater than values in the first look-up table.

5. The method of claim 1, where the powertrain speed is a rotational speed of an electric machine.

6. The method of claim 1, where adjusting the time constant includes increasing the time constant in response to the driver requested powertrain power being less than the filtered driver requested powertrain power.

7. The method of claim 1, where the driver requested powertrain power is input via an accelerator pedal.

8. The method of claim 1, further comprising adjusting output of a powertrain propulsion source via the controller in response to the filtered driver requested powertrain power.

9. A powertrain operating method, comprising:
filtering a driver requested powertrain power as a function of a powertrain speed to generate a filtered driver requested powertrain power via a first order low pass filter by adjusting a time constant of the first order low pass filter based on the powertrain speed within a controller; and
adjusting output of a powertrain propulsion source via the controller in response to the filtered driver requested powertrain power.

10. The method of claim 9, where adjusting output of the powertrain propulsion source includes adjusting output power of an engine.

11. The method of claim 9, where adjusting output of the powertrain propulsion source includes adjusting output power of an electric machine.

12. The method of claim 9, where the driver requested powertrain power is input via an accelerator pedal.

13. The method of claim 9, where adjusting the time constant of the first order low pass filter includes increasing the time constant in response to the driver requested powertrain power being less than the filtered driver requested powertrain power.

14. The method of claim 9, where adjusting the time constant includes accessing a look-up table to determine the time constant.

15. A system, comprising:
an engine;
an accelerator pedal; and
a controller including executable instructions stored in non-transitory memory to generate a driver requested powertrain power via the accelerator pedal, instructions to filter the driver requested powertrain power by adjusting a time constant of a first order low pass filter based on a powertrain speed to generate a filtered driver requested powertrain power, and instructions to start and stop the engine responsive to the filtered driver requested powertrain power.

16. The system of claim 15, further comprising additional instructions to adjust output of the engine responsive to the filtered driver requested powertrain power.

17. The system of claim 15, where the powertrain speed is a speed of a torque converter impeller.

18. The system of claim 15, where adjusting the time constant includes accessing a look-up table to determine the time constant.

19. The system of claim 15, where adjusting the time constant includes increasing the time constant in response to the driver requested powertrain power being less than the filtered driver requested powertrain power.

* * * * *